United States Patent
Hasegawa et al.

(10) Patent No.: US 11,135,986 B2
(45) Date of Patent: Oct. 5, 2021

(54) VEHICLE BODY STRUCTURE

(71) Applicant: HONDA MOTOR CO., LTD., Tokyo (JP)

(72) Inventors: Atsushi Hasegawa, Wako (JP); Keiichiro Tsuji, Wako (JP); Yusuke Miura, Yamato (JP); Ryota Yamane, Tokyo (JP); Tomohiro Shimizu, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 147 days.

(21) Appl. No.: 16/658,695

(22) Filed: Oct. 21, 2019

(65) Prior Publication Data
US 2020/0130618 A1 Apr. 30, 2020

(30) Foreign Application Priority Data
Oct. 24, 2018 (JP) .............................. JP2018-200283

(51) Int. Cl.
*B60R 19/18* (2006.01)

(52) U.S. Cl.
CPC ...... *B60R 19/18* (2013.01); *B60R 2019/1806* (2013.01)

(58) Field of Classification Search
CPC .. B60R 19/18; B60R 19/24; B60R 2019/1806
See application file for complete search history.

(56) References Cited

U.S. PATENT DOCUMENTS

2018/0222415 A1\* 8/2018 Byun ...................... B60R 19/18

FOREIGN PATENT DOCUMENTS

JP            H1076889 A        3/1998

\* cited by examiner

*Primary Examiner* — D Glenn Dayoan
*Assistant Examiner* — Melissa Ann Bonifazi
(74) *Attorney, Agent, or Firm* — Armstrong Teasdale LLP

(57) ABSTRACT

A bumper beam of a vehicle body structure (1) is provided with a laterally extending laterally middle part (55) and a pair of end parts (56) each extending from a corresponding lateral end of the middle part in an outboard direction with a certain inward slant with respect to a fore and aft direction, and each end part curves at a laterally middle point thereof so as to have a concave side facing outward with respect to the fore and aft direction.

9 Claims, 8 Drawing Sheets

VEHICLE BODY STRUCTURE

TECHNICAL FIELD

The present invention relates to a vehicle body structure including a bumper beam.

BACKGROUND ART

In a known vehicle body rear structure, a bumper beam extending in the lateral direction is connected to the front ends of a pair of side members extending in the fore and aft direction along either side of the vehicle body. See JPH10-76889A. The bumper beam is slightly curved such that the concave side thereof faces rearward, and a connecting plate is connected to the rear side of the bumper beam at two lateral ends thereof. The bumper beam deforms into a more straight shape (so as to reduce the curvature thereof) at the time of a frontal crash, but the connecting plate reduces such a deformation of the bumper beam.

When an object collides with the vehicle at a laterally offset front part thereof (offset collision), the bumper beam receives a loading at a laterally offset point. In such a case, the crash load is not transmitted to the side members in an even manner so that the vehicle body may deform in an uneven manner.

SUMMARY OF THE INVENTION

In view of such a problem of the prior art, a primary object of the present invention is to provide a vehicle body structure, having a pair of side members and a bumper beam, which is configured to transmit a crash load evenly between the two side members.

To achieve such an object, the present invention provides a vehicle body structure (1) including a laterally extending bumper beam (3), wherein the bumper beam is provided with a laterally extending laterally middle part (55) and a pair of end parts (56) each extending from a corresponding lateral end of the middle part in an outboard direction with a certain inward slant with respect to a fore and aft direction, and each end part curves at a laterally middle point (P2) thereof so as to have a concave side facing outward with respect to the fore and aft direction.

Since the outward side of each end part presents a concave surface in plan view, the loading of an object having a certain width that crashes with a laterally offset part of the bumper beam tends to be transmitted to the laterally middle part of the bumper beam so that the crash loading is evenly transmitted to the side members which are connected to the bumper beam and extend on either side of the vehicle body. As a result, the vehicle body is prevented from deforming in an uneven manner at the time of a crash.

Preferably, the bumper beam curves so as to have a convex side facing outward and having a radius of curvature of R1 at each laterally outer end point (P1) of the middle part (55) of the bumper beam, and the concave side of each end part of the bumper beam has a radius of curvature of R2, the radius of curvature R2 being equal to or greater than the radius of curvature R1.

Since each end part curves in a smooth manner, crash load is prevented from being concentrated in the middle point of either end part of the bumper beam.

Preferably, the bumper beam has an upper surface (72) facing upward and an abutting surface (70) facing outward, and is provided with a load transmitting member (75) extending laterally on the middle part of the bumper beam, the load transmitting member being provided with a vertically extending outer wall (81) facing outward, a lower wall (82) extending inward from a lower edge of the outer wall and abutting against the upper surface and the abutting surface of the bumper beam, and an inner wall (83) connected between an upper edge of the outer wall and an inner edge of the lower wall.

The load transmitting member thus defines a closed cross section with the outer wall, the lower wall and the inner wall so that the load transmitting member can be made highly resistant to deformation. The load transmitting member prevents an object colliding with the vehicle from riding over the upper surface of the bumper beam.

Preferably, the lower wall includes a main portion (86) that rests upon the upper surface of the bumper beam, and a depending portion (87) depending downward from an outer edge of the main portion and extending along the abutting surface of the bumper beam.

Since the inward movement of the load transmitting member is restricted by the bumper beam, an object colliding with the vehicle is prevented from riding over the upper surface of the bumper beam.

Preferably, the load transmitting member is provided with a load absorbing wall (84) connecting the lower wall to the inner wall. The load transmitting member may be further provided with a load transmitting wall (85) connecting the load absorbing wall to the outer wall.

The load absorbing wall and the load transmitting wall separate the closed cross section of the load transmitting member into a plurality of smaller cross sections so that the mechanical strength and the energy absorbing property of the load transmitting wall can be improved.

Preferably, an upper end of the inner wall is provided with an inner wall recess (91) which is recessed downward.

The recess makes the upper end of the inner wall more deformable so that the upper edge of the outer wall can be readily displaced inward at the time of a crash. This promotes the inward movement of the load transmitting member at the time of a crash so that the energy absorbing property of the load transmitting member can be improved.

Preferably, the abutting surface is provided with a beam recess (66) which is recessed inward, and the depending portion (87) of the load transmitting member is complementarily received in the beam recess.

Thereby, the bumper beam and the load transmitting member are firmly joined to each other so that the loading can be transmitted from the load transmitting member to the bumper beam in a reliable manner.

Preferably, the beam recess is defined by a recess abutting wall (68) depending downward from an outer edge of the upper surface of the bumper beam and defining the abutting surface on an outer side thereof with respect to the fore and aft direction, and a recess lower wall (69) extending outward from a lower edge of the recess abutting wall.

Thereby, a crash load applied to the load transmitting member is supported buy the recess abutting wall and the recess lower wall so that the outward movement or the downward movement of the load transmitting member relative to the bumper beam is prevented. As a result, an object colliding with the vehicle is prevented from riding over the upper surface of the bumper beam.

Preferably, the load absorbing wall (84) includes a first absorbing wall (95) extending upward from a boundary between the main portion and the depending portion of the lower wall, and a second absorbing wall (96) extending inward from an upper edge of the first absorbing wall to the inner wall, and the load transmitting wall is connected to a boundary between the first absorbing wall and the second absorbing wall.

According to this arrangement, when the outer wall is subjected to a crash load directed inward and downward, the load is transmitted to the first absorbing wall and the second absorbing wall. The resulting deformation of the first absorbing wall and the second absorbing wall can absorb a large amount of energy.

The present invention thus provides a vehicle body structure, having a pair of side members and a bumper beam, which is configured to transmit a crash load evenly between the two side members.

DESCRIPTION OF THE PREFERRED EMBODIMENT(S)

Preferred embodiments of the present invention are described in the following with reference to the appended drawings. In the following description, the directions may be referred to as "inboard" and "outboard" to indicate the lateral directions in the normal sense of the terms, and as "inward (inner)" and "outward (outer)" to indicate the directions directed toward and away from the center of the vehicle in the fore and aft direction. The claims should be also interpreted based on this definition of the terms. Since the vehicle body is essentially symmetric with respect to a longitudinal center line, only one side of the vehicle body may be described in the following description to avoid redundancy.

Figure 1:
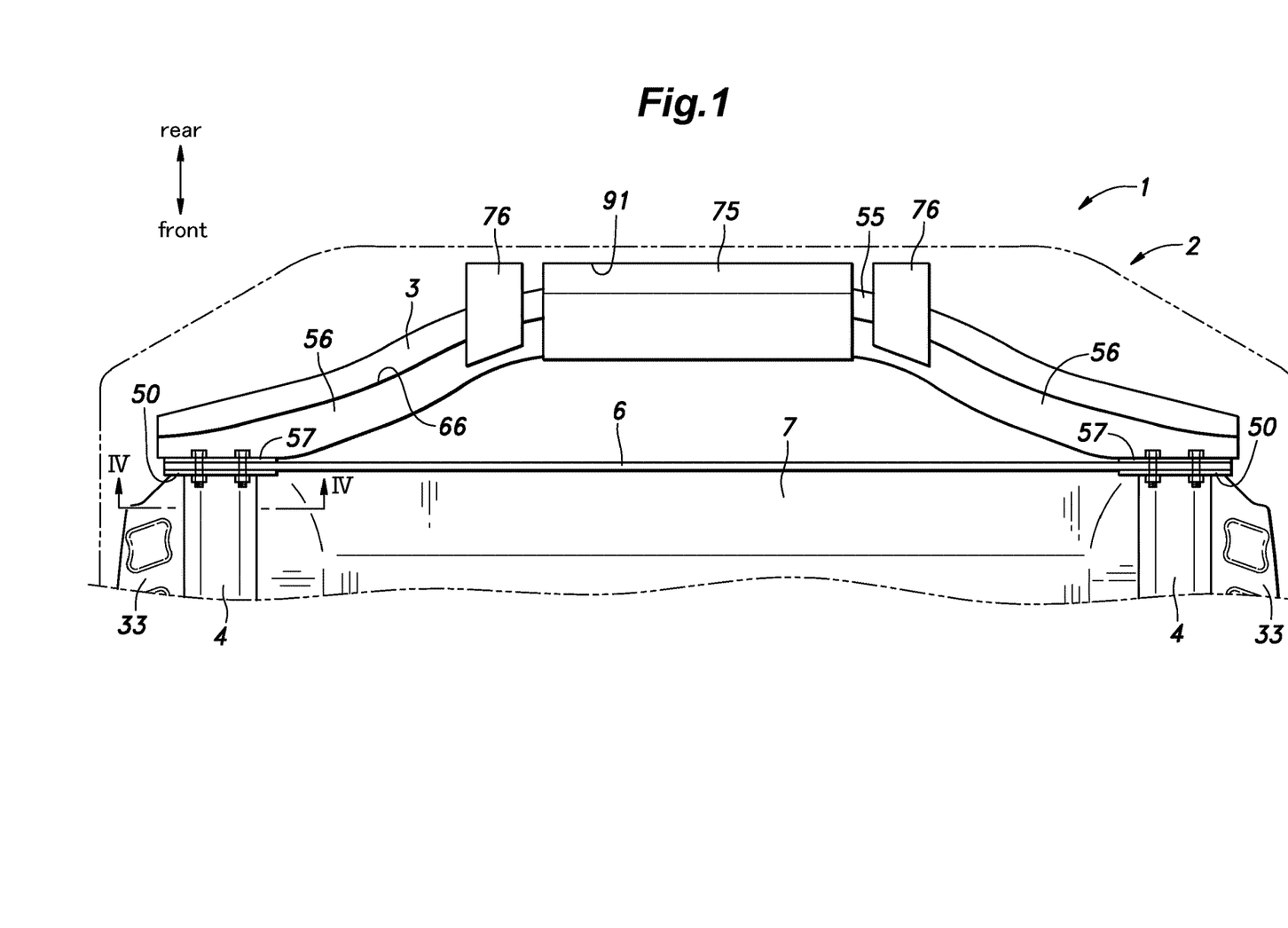
FIG. 1 is a top view of a rear part of a vehicle body provided with a vehicle body structure according to an embodiment of the present invention.

As shown in FIG. 1, the vehicle body structure 1 includes a bumper beam 3 extending laterally in a rear end part of the vehicle body 2, and a pair of side members 4 extending forward from the front side the bumper beam 3 along either side of the vehicle body 2.

The vehicle body structure 1 further includes a rear panel 6 extending laterally and vertically between the rear ends of the side members 4, and interposed between the left side member 4 and the bumper beam 3 and between the right side member 4 and the bumper beam 3 at the lateral end parts thereof, respectively, and a floor panel 7 extending horizontally between the two side members 7.

Figure 4:
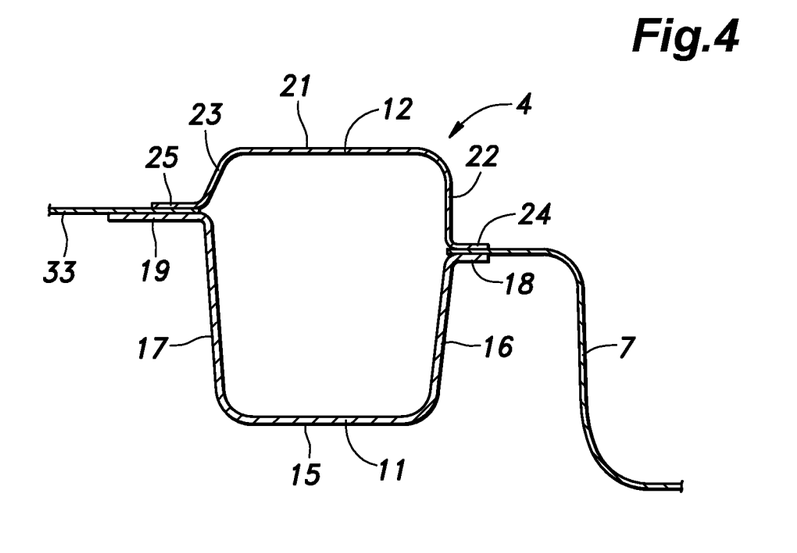
FIG. 4 is a sectional view taken along line IV-IV of FIG. 1.

As shown in FIG. 4, each side member 4 includes a lower member 11 having a U-shaped cross section and having an open side facing upward, and an upper member 12 having a U-shaped cross section and having an open side facing downward. The lower member 11 includes a lower wall 15 extending substantially horizontally, a lower inner side wall 16 extending vertically upward from the inboard edge of the lower wall 15, a lower outer side wall 17 extending vertically upward from the outboard edge of the lower wall 15, a lower inner flange 18 extending in the inboard direction from the upper edge of the lower inner side wall 16, and a lower outer flange 19 extending in the outboard direction from the upper edge of the lower outer side wall 17.

The upper member 12 includes an upper wall 21 extending substantially horizontally, an upper inner side wall 22 extending vertically downward from the inboard edge of the upper wall 21, an upper outer side wall 23 extending vertically downward from the outboard edge of the upper wall 21, an upper inner flange 24 extending in the inboard direction from the upper edge of the upper inner side wall 22, and a upper outer flange 25 extending in the outboard direction from the upper edge of the upper outer side wall 23.

The upper member 12 is joined to the lower member 11 by attaching the upper inner flanges 24 to the lower inner flange 18 and the upper outer flange 25 to the lower outer flange 19 by spot welding so that the side member 4 is formed as a tubular member having a rectangular cross section. In the illustrated embodiment, each outboard edge of the floor panel 7 is interposed between the lower inner flange 18 and the upper inner flange 24, and jointly welded thereto. An inboard edge of a horizontally extending auxiliary panel 33 is interposed between the lower outer flange 19 and the upper outer flange 25.

Figure 3:
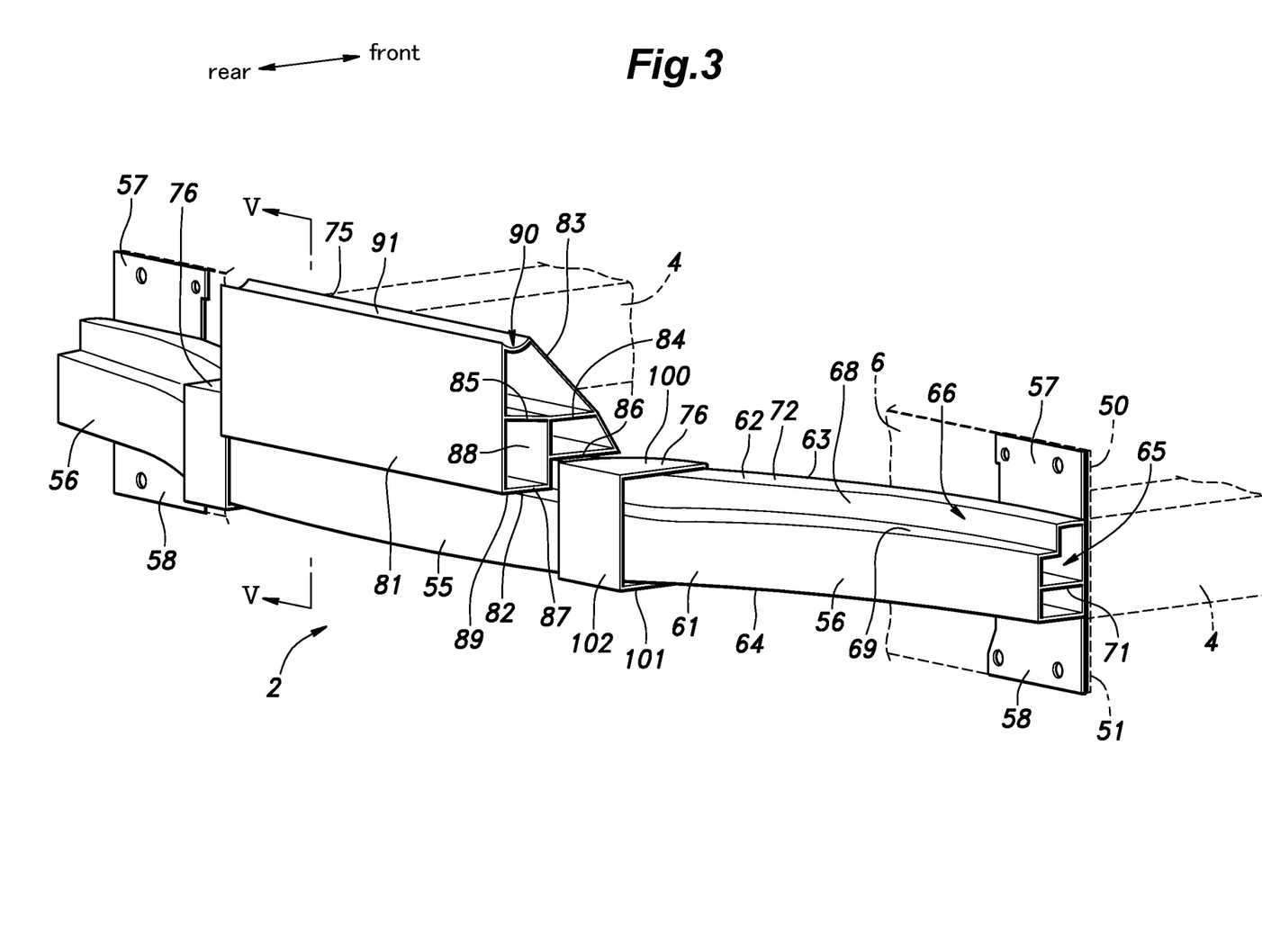
FIG. 3 is a perspective view of the rear part of the vehicle body.

As shown in FIGS. 1 and 3, in the illustrated embodiment, an upper rear flange 50 extends upward from the rear edge of the upper wall 21 of the side member 4, and a lower rear flange 51 extends downward from the rear edge of the lower wall 15 of the side member 4. Each of the upper rear flange 50 and the lower rear flange 51 is provided with bolt holes in suitable parts thereof.

The rear panel 6 extends both laterally and vertically. The rear panel 6 is provided with bolt holes at positions corresponding to the bolt holes provided in the upper rear flange 50 and the lower rear flange 51.

As shown in FIG. 3, the rear bumper beam 3 consists of a hollow beam member having a rectangular cross section and extending generally laterally. The rear bumper beam 3 may be formed, for instance, by extruding or roll forming aluminum or an aluminum alloy. The rear bumper beam 3 is symmetric about a central longitudinal line of the vehicle body, and is generally bent or curved forward toward each lateral end thereof. The rear bumper beam 3 thus includes a laterally extending middle part 55, and a pair of obliquely extending laterally end parts 56 each bent or curved forward toward the lateral ends thereof.

Figure 2:
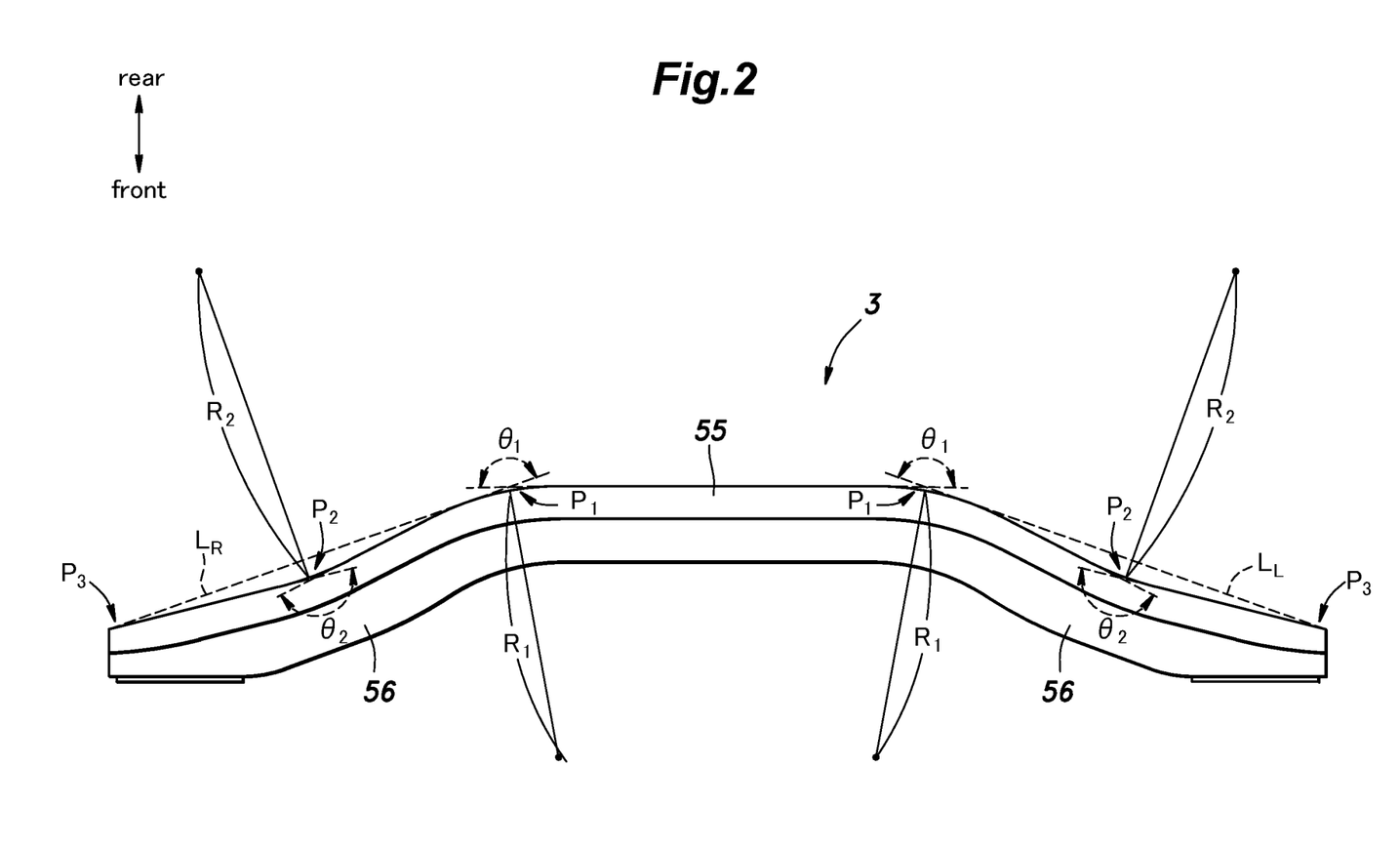
FIG. 2 is a top view of a bumper beam showing the configuration thereof.

As shown in FIG. 2, the bumper beam 3 has a convex side facing outward and having a radius of curvature of R1 at each laterally outer end point P1 of the middle part 55 of the bumper beam 3, and a concave side facing outward (with respect to the fore and aft direction) and having a radius of curvature of R2 at a middle point P2 of each end part 56 of the bumper beam 3. The bending angle θ1 of the bumper beam 3 at the end point P1 is preferably between 140 degrees and 160 degrees (inclusive of 140 degrees and 160 degrees). In this embodiment, the bending angle θ1 of the bumper beam 3 at the end point P1 is selected to be about 175 degrees. As shown in FIG. 2, the radius of curvature R2 at the point P2 is equal to or greater than the radius of curvature R1 at the end point P1.

Further, each end part 56 is curved at a middle portion thereof containing the middle point P2, and the rear side thereof is formed by a concave surface. As a result, on the rear side of the bumper beam 3, the middle point P2 of each end part 56 is located ahead of an imaginary line ($L_L$ and $L_R$ in FIG. 2) connecting the outer end point P1 of the middle part 55 and the outer end point P3 of the corresponding end part 56. Further, the bending angle θ2 at the middle point P2 is preferably equal to or greater than the bending angle θ1 at the outer end point P1. More specifically, the bending angle θ2 at the middle point P2 is preferably between 160 degrees and 170 degrees (inclusive of 160 degrees and 170 degrees). In the illustrated embodiment, the bending angle θ1 at the outer end point P1 is set to be about 175 degrees. Further, as shown in FIG. 2, the bending radius of curvature R1 at the middle point P2 is equal to or greater than the bending radius of curvature R2 at the outer end point P1.

As shown in FIG. 3, the bumper beam 3 is provided with a front wall 61, an upper wall 62, a rear wall 63, and a lower wall 64 so that an inner bore 65 is defined along the lengthwise direction thereof. The upper wall 62 of the bumper beam 3 has an upper surface 72 facing substantially upward. Between the rear wall 63 and the upper wall 62 is defined a beam recess 66 that is recessed toward the inner bore 65 and extends in the lateral direction over the entire length of the bumper beam 3. More specifically, the beam recess 66 is defined by a recess abutting wall 68 extending downward from the rear edge of the upper wall 62 of the bumper beam 3, and a recess lower wall 69 extending rearward from the lower edge of the recess abutting wall 68 of the bumper beam 3 and connected to the rear wall 63 of the bumper beam 3. The recess abutting wall 68 has a plate shape extending in the vertical direction, and the rear surface thereof is formed as an abutting surface 70 facing substantially rearward. The recess lower wall 69 has a plate shape, and faces in the vertical direction. In the present embodiment, the inner bore 65 of the bumper beam 3 is provided with a reinforcing wall 71 that extends substantially horizontally between the front wall 61 and the rear wall 63 of the bumper beam 3.

As shown in FIG. 3, an outboard end of each end part 56 is provided with an upper front flange 57 extending upward from the front end of the upper surface of the bumper beam 3 in a plate shape, and a lower front flange 58 extending downward from the front end of the lower surface of the bumper beam 3 in a plate shape. The upper front flange 57 and the lower front flange 58 are each provided with bolt holes at predetermined positions thereof. The upper rear flange 50, the rear panel 6, and the upper front flange 57, and the lower rear flange 51, the rear panel 6, and the lower front flange 58 are respectively fastened by bolts that are passed through the bolt holes. Thereby, the bumper beam 3, the rear panel 6, and the side member 4 are integrally joined to one another.

Further, as shown in FIGS. 1 and 3, a load transmitting member 75 is attached to a rear side of the middle part 55 of the bumper beam 3, and a stiffening member 76 is attached a part of the bumper beam 3 slightly spaced in the outboard direction from each outboard edge of the load transmitting member 75. The load transmitting member 75 has a hollow cross section, and is formed by extruding or roll forming, for example, aluminum or an aluminum alloy, similarly as the bumper beam 3. The load transmitting member 75 has a certain lateral width, and is attached to the middle part 55 of the bumper beam 3. The lateral width of the load transmitting member 75 is preferably between 25% and 35% (inclusive of 25% and 35%) of the lateral dimension of the bumper beam 3.

Figure 5:
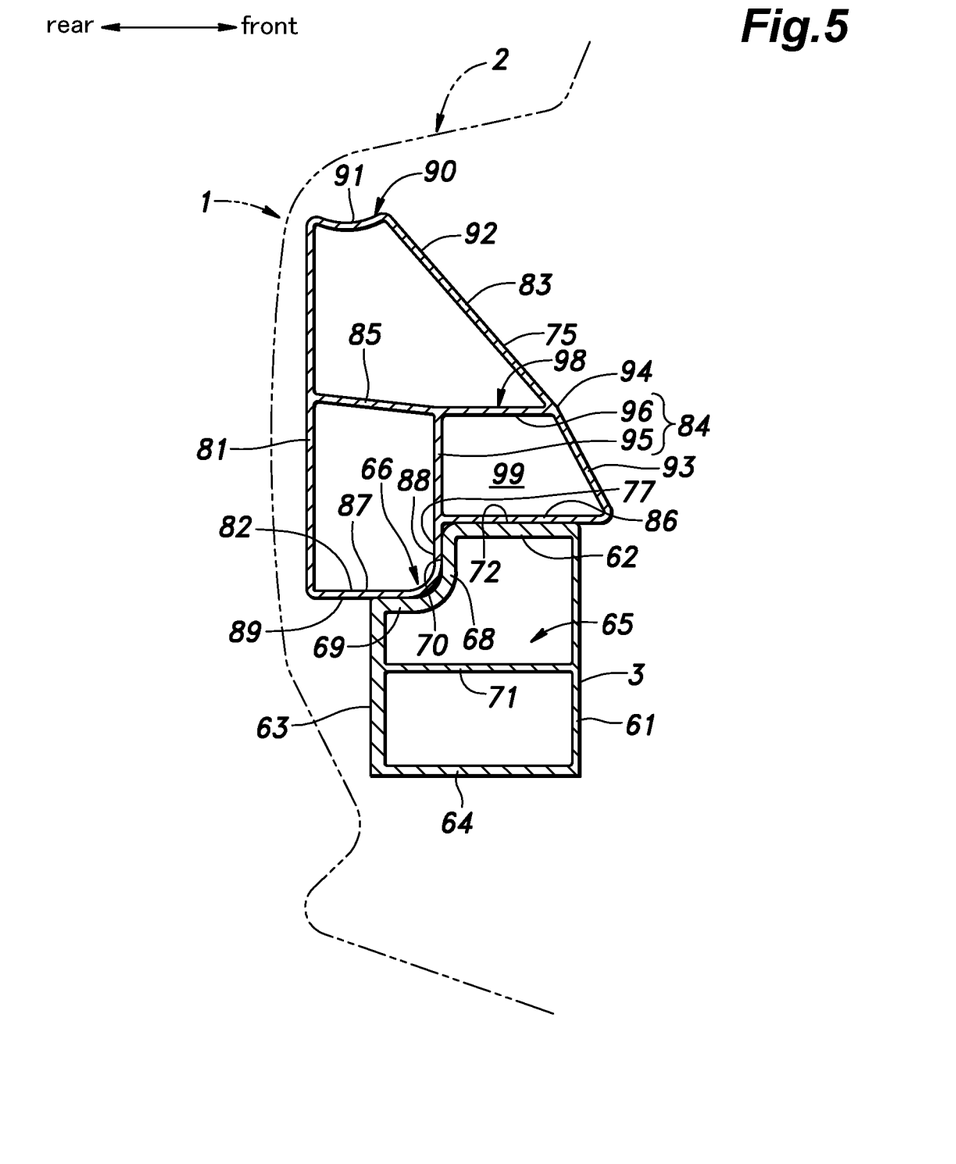
FIG. 5 is a sectional view taken along line V-V of FIG. 3.

As shown in FIG. 5, the load transmitting member 75 includes a rear wall 81 (outer wall) facing rearward, a lower wall 82 extending forward from the lower edge of the rear wall 81 and abutting against the upper surface 72 of the upper wall 62 and the abutting surface 70 of the bumper beam 3, a front wall 83 (inner wall) connecting the upper edge of the rear wall 81 to the front edge of the lower wall 82, a load absorbing wall 84 connecting the lower wall 82 to the front wall 83, and a load transmitting wall 85 connecting the load absorbing wall 84 to the rear wall 81.

The rear wall 81 consists of a plate member facing rearward, and is positioned a small distance behind the recess lower wall 69, or behind the bumper beam 3. The lower wall 82 includes a main portion 86 that contacts the upper surface 72 of the bumper beam 3, and a depending portion 87 that bulges downward along the abutting surface 70 of the bumper beam 3, and is complementarily received by the beam recess 66. The main portion 86 has a substantially horizontal plate shape, extends forward from a part directly on the rear edge of the upper wall 62 of the bumper beam 3 along the upper wall 62, and reaches a part slightly beyond the front edge of the upper wall 62. The depending portion 87 includes a depending front wall 88 that extends downward from the rear edge of the main portion 86 along the abutting surface 70, and a depending lower wall 89 extending rearward from the lower edge of the depending front wall 88 along the upper surface of the recess lower wall 69. The depending front wall 88 abuts against the abutting surface 70 at the front surface thereof, and the depending lower wall 89 abuts against the upper surface of the recess lower wall 69 at the lower surface thereof. The depending lower wall 89 is connected to the lower edge of the rear wall 81 at the rear edge thereof.

The front wall 83 consists of a plate member facing obliquely upward and forward, and is connected to the upper edge of the rear wall 81 at the upper edge thereof and to the front edge of the main portion 86 at the lower edge thereof. As a result, the load transmitting member 75 has a closed cross section 90 formed by the rear wall 81, the lower wall 82, and the front wall 83. A front wall recess 91 (inner wall recess) that is recessed downward is formed in the upper end of the front wall 83. The front wall recess 91 extends in the vehicle width direction so as to cover the entire length of the load transmitting member 75. In this embodiment, the front wall 83 includes a front wall upper part 92 extending obliquely downward and forward from the front wall recess 91, and a front wall lower portion 93 connected to the lower edge of the front wall upper part 92 and to the rear edge of the main portion 86 of the lower wall 82. The front wall 83 has a bent portion 94 extending along the boundary between the front wall upper portion 92 and the front wall lower portion 93 and formed by bending the front wall upper portion 92 forward relative to the front wall lower portion 93.

The load absorbing wall 84 includes a first absorbing wall 95 extending upward from the boundary between the main portion 86 and the depending portion 87 of the lower wall 82, and a second absorbing wall 96 extending forward from the upper end of the first absorbing wall 95 to the rear surface of the front wall 83 (the bent portion 94 at the boundary between the front wall upper portion 92 and the front wall lower portion 93). The second absorbing wall 96 may be connected to the rear surface of the front wall 83 at a height that is ½ to ¼ of the total height of the front wall 83. Thus, a substantially trapezoidal closed cross section 98 is formed by the load absorbing wall 84, the main portion 86, and the front wall lower portion 93, and a hollow cross section 99 is formed therein.

The load transmitting wall 85 has a substantially horizontal plate shape, and is connected to the front surface of the rear wall 81 at the rear edge thereof, and to the boundary between the first absorbing wall 95 and the second absorbing wall 96 at the front edge thereof. The load transmitting wall 85 is connected to a vertically central part of the rear wall 81, and inclines slightly downward toward the front.

As shown in FIG. 3, the stiffening members 76 are each formed by bending a strip of sheet metal into a substantially U shape, and are positioned in mutually symmetric positions on the bumper beam 3. Each stiffening member 76 includes a stiffening member upper wall 100 extending substantially horizontally, a stiffening member lower wall 101 extending under the stiffening member upper wall 100 in parallel with the stiffening member upper wall 100 and conformal to the stiffening member upper wall 100 in plan view, and a stiffening member rear wall 102 facing forward and connected between the rear edges of the stiffening member upper wall 100 and the stiffening member lower wall 101.

The stiffening member upper wall 100 extends forward from behind the rear edge of the bumper beam 3 along the upper surface 72 of the upper wall 62 of the bumper beam 3, and protrudes forward from the front edge of the upper wall 62 of the bumper beam 3. The stiffening member lower wall 101 similarly extends forward from behind the rear edge of the bumper beam 3 along the lower surface of the lower wall 64 of the bumper beam 3, and protrudes forward from the lower wall of the bumper beam 3.

The rear surface of the stiffening member rear wall 102 aligned with the rear surface of the rear wall 81 of the load transmitting member 75 in side view. The stiffening member 76 is welded to a part of the bumper beam 3 near the outboard end of the middle part 55 at the stiffening member upper wall 100 and the stiffening member lower wall 101. The stiffening member 76 may be positioned so as to include the outer end point P1 of the middle part 55 therein.

Various features and advantages of the vehicle body structure 1 according to the illustrated embodiment are discussed in the following. As shown in FIG. 2, the end parts 56 of the bumper beam 3 are each curved so as to face the convex side inward (with respect to the fore and aft direction) at a substantially central part thereof. Therefore, with respect to the rear side of the bumper beam 3, the middle point P2 located centrally in each outer end part 56 is located in front of the imaginary line ($L_L$ and $L_R$ of FIG. 2) connecting the outer end point P1 of the middle part 55 with the outer end point P3 of the outer end part 56.

Figure 6A:
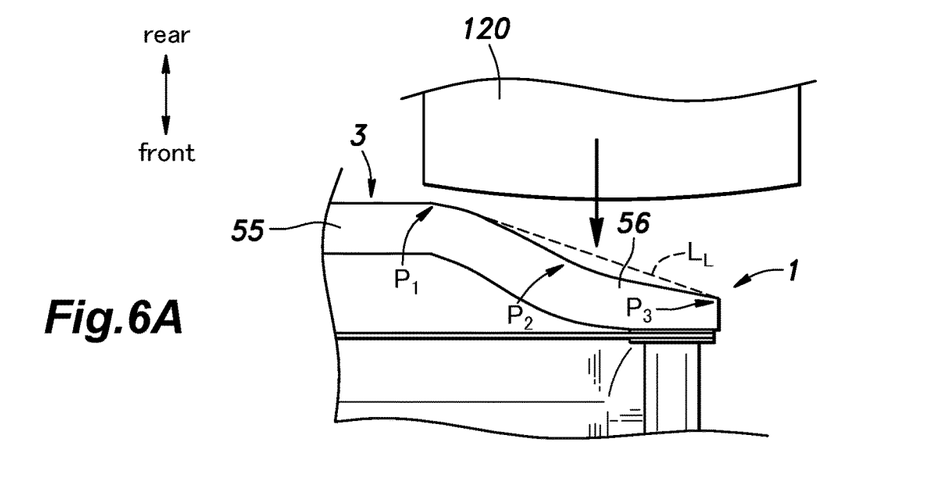
FIG. 6A is a diagram illustrating a time history of the relationship between the bumper beam and an object colliding with a rear end part of the vehicle body.
Figure 6B:
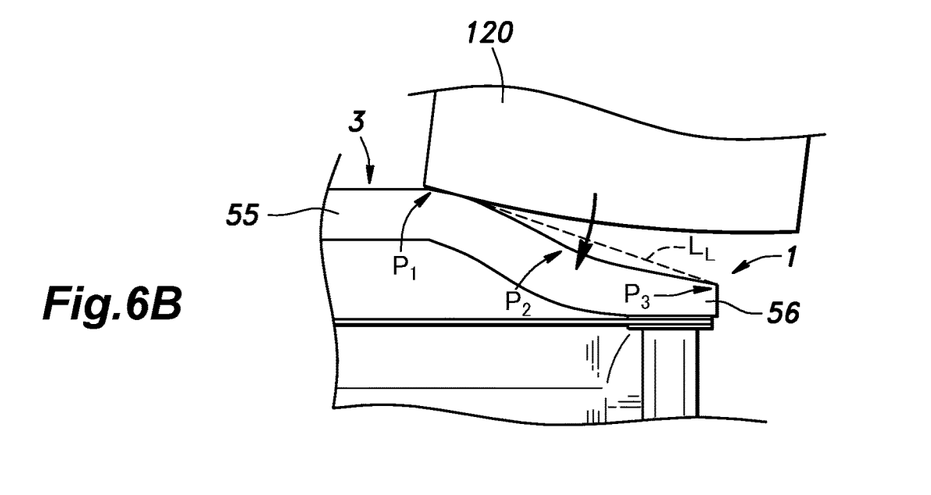
FIG. 6B is a diagram illustrating a time history of the relationship between the bumper beam and an object colliding with a rear end part of the vehicle body.
Figure 6C:
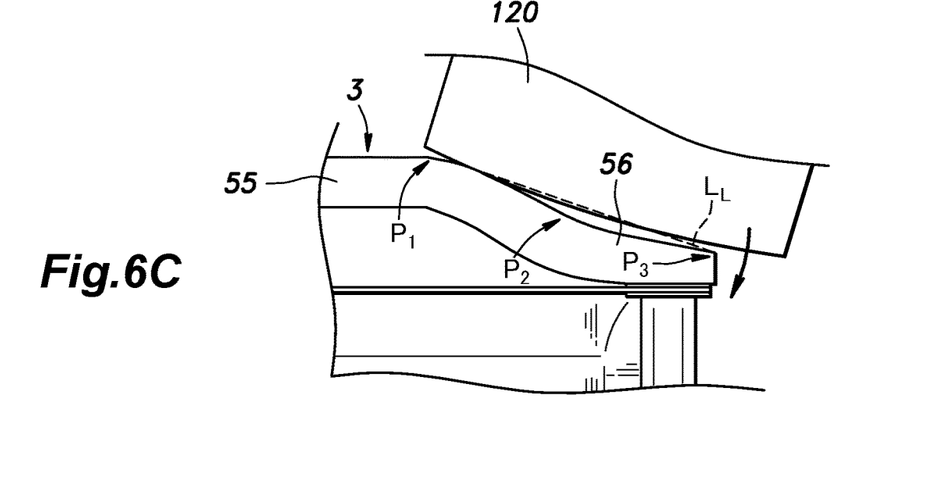
FIG. 6C is a diagram illustrating a time history of the relationship between the bumper beam and an object colliding with a rear end part of the vehicle body.

In order to show the positional relationship between the bumper beam 3 and an object 120 colliding with the vehicle body structure 1 from the rear, the time history of the movement of the object 120 and the bumper beam 3 at the time of the collision is shown in FIGS. 6A to 6C. When the object 120 approaches the bumper beam 3 from the rear (FIG. 6A), and collides with the rear end part of the vehicle in a laterally offset relationship (FIG. 6B), owing to the concavity of the rear surface of the end part 56 of the bumper beam 3 and the forward slanting of the end part 56 of the bumper beam 3, a large part of the crash load is applied to an outboard end part of the middle part 55 of the bumper beam 3, instead of a part of the bumper beam 3 corresponding to a laterally middle point of the object 120. As a result, in spite of the offset in the crash load, the crash load is applied to a relatively laterally central part of the bumper beam 3 so that the crash load can be transmitted relatively evenly to the side members 4.

As the collision progresses further as shown in FIG. 6C, the object 120 is caused to rotate around the outboard end of the middle part 55, or the part of the middle part adjacent to the outer end point P1, and the object 120 comes into engagement with the outboard end of the end part 56 or the part adjacent to the outer end point P3 as well. Since the rear side of the outer end part 56 is concavely curved toward the rear, or the middle point P2 located centrally in each outer end part 56 is located in front of the imaginary line ($L_L$ and $L_R$ of FIG. 2) connecting the outer end point P1 of the middle part 55 with the outer end point P3 of the outer end part 56, the crash load is concentrated in the outboard end of the middle part 55 and the rear end of the side member 4, and the part of the bumper beam 3 located between the outer end point P1 of the middle part 55 and the outer end point P3 of the outer end part 56 is spared from the crash load. Therefore, the crash load is distributed between a laterally central part of the bumper beam 3 and a part of the bumper beam 3 located directly behind the rear end of the side member 4 so that the loading of the rear end crash can be distributed evenly to the vehicle body, and the vehicle body is allowed to deform under the crash load in an even manner.

Furthermore, according to the illustrated embodiment, even in the case of an offset rear end crash, a large part of the crash load is supported by the middle part so that the vehicle body is allowed to deform under the crash load in an even manner.

The bumper beam 3 has a convex side facing outward and having a radius of curvature of R1 at each laterally outer end point P1 of the middle part 55 of the bumper beam 3, and a concave side facing outward and having a radius of curvature of R2 at the middle point P2 of each end part 56 of the bumper beam 3, the radius of curvature R2 being equal to or greater than the radius of curvature R1. According to the bumper beam 3 of the illustrated embodiment, it is desirable to prevent the buckling of the bumper beam 3 at the middle point P2 of each end part 56 of the bumper beam 3. However, by selecting the radius of curvature R2 to be equal to or greater than the radius of curvature R1, the end parts 56 of the bumper beam 3 can be made resistant to buckling deformation.

Figure 7:
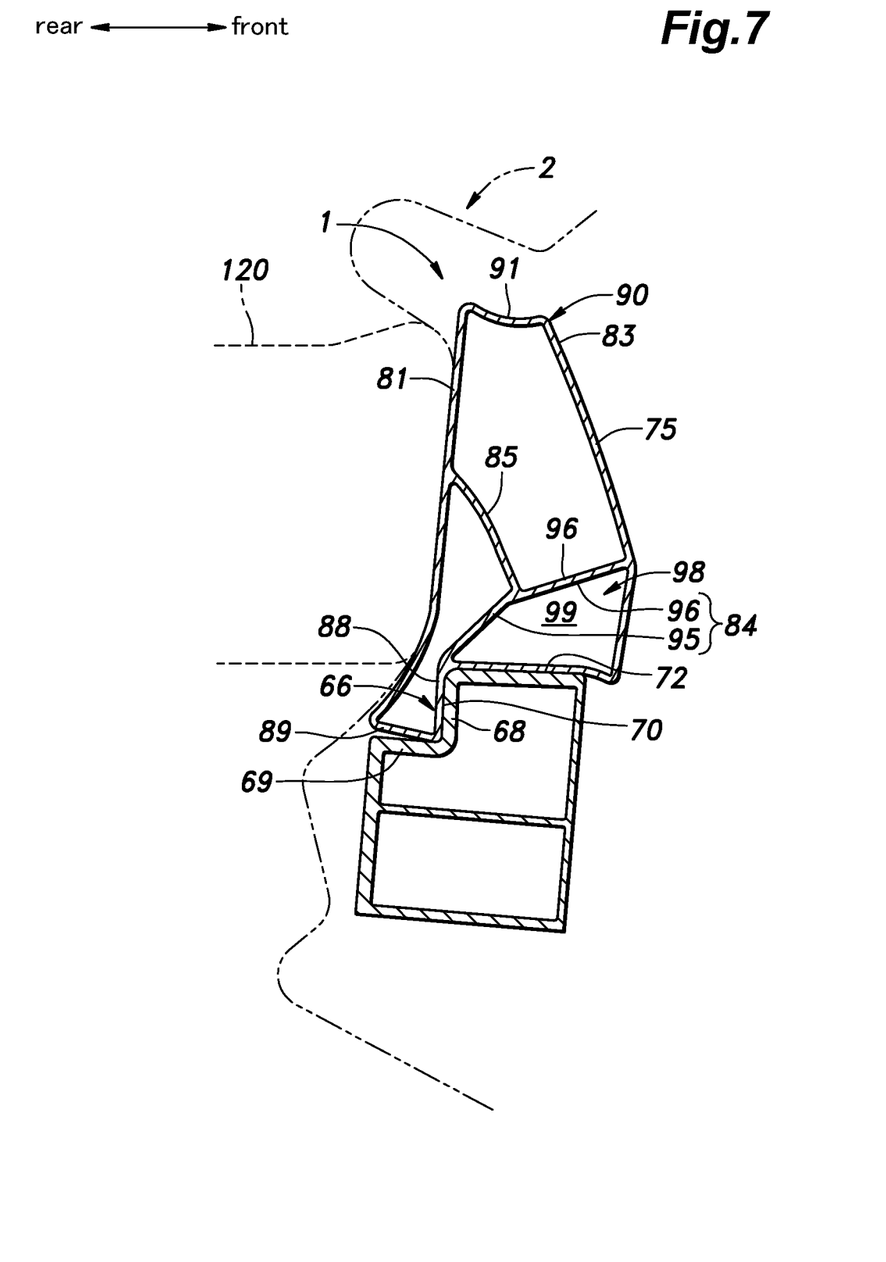
FIG. 7 is a sectional view showing the mode of deformation of the bumper beam at the time of a rear end crash.

As shown in FIG. 7, in a typical rear end crash, the impact load from an object 120 is applied to the rear surface of the rear wall 81 of the load transmitting member 75. Since the load transmitting member 75 has a closed cross section 90 formed by the rear wall 81, the lower wall 82, and the front wall 83, the load transmitting member 75 is resistant to deformation as compared to a flat plate or an L shaped plate. Therefore, the load transmitting member 75 is allowed to retain the substantially original shape thereof so that the load transmitting member 75 is prevented from riding over the upper surface 72 of the bumper beam 3.

When the rear wall 81 is pushed forward by a crash load, the load is transmitted to the boundary between the first absorbing wall 95 and the second absorbing wall 96 via the load transmitting wall 85. As a result, a substantially forward load is applied to the upper end of the first absorbing wall 95, and the first absorbing wall 95 rotates forward about the lower edge thereof. At this time, as shown in FIG. 7, the load absorbing wall 84, the lower wall 82, and the front wall 83 undergo plastic deformation so that the hollow cross section 99 is crushed. Since the load from the rear end of the vehicle body 2 is absorbed by the plastic deformation of the load absorbing wall 84, the lower wall 82, and the front wall 83, the load transmitting member 75 can effectively absorb the load as compared to the case where foam material for absorbing the load is filled inside the load transmitting member 75.

When a crash load is applied to the rear wall 81, the front wall recess 91 is deformed so as to be recessed further downward with the result that the upper end of the rear wall 81 is allowed to move forward. By providing the front wall recess 91, the upper end portion of the front wall 83 is made more deformable. As a result, the load transmitting wall 85 is pushed forward as soon as the upper end of the rear wall 81 moves forward. Thus, by providing the front wall recess 91, the load applied to the rear wall 81 is efficiently transmitted to the load absorbing wall 84, and the load absorbing wall 84, the lower wall 82, and the front wall 83 so that these walls to undergo plastic deformation from an early stage of the crash.

The load transmitting member 75 is in contact with the abutting surface 70 of the bumper beam 3 at the depending portion 87. When a crash load is applied to the load transmitting member 75 from the rear, the load transmitting member 75 is supported from the front by the concave abutting wall 68, and the movement of the load transmitting member 75 to the front side (the vehicle inner side) is restricted by the concave abutting wall 68. Therefore, the object 120 colliding with the rear part of the vehicle body 2 from the rear is prevented from riding over the upper surface 72 of the bumper beam 3.

Further, the downward movement of the load transmitting member 75 is restricted by the recess lower wall 69. Thus, when a downward load is applied to the load transmitting member 75, the load transmitting member 75 is supported from below by the concave lower wall 69 so that the load transmitting member 75 is prevented from moving downward relative to the bumper beam 3 or dropping off from the bumper beam 3. Thereby, the colliding object 120 is prevented from riding over the upper surface 72 of the bumper beam 3 in a reliable manner.

Further, the crash load applied to the load transmitting member 75 is transmitted to the abutting surface 70 of the bumper beam 3, and is distributed to the side members 4 via the rear ends of the side members 4. Therefore, the crash load is prevented from concentrating in any particular part of the vehicle body 2 so that uncontrolled deformation of the vehicle body 2 can be avoided. In this embodiment, the depending front wall 88 abuts against the recess abutting wall 68 and the depending lower wall 89 abuts against the recess lower wall 69 at the time of a crash so that the depending portion 87 is complementarily fitted in the beam recess 66. Therefore, the bumper beam 3 and the load transmitting member 75 are so firmly engaged with each other that the crash load is efficiently transmitted from the load transmitting member 75 to the bumper beam 3, and the crash load is more evenly distributed.

The front end of the load transmitting wall 85 is connected to the junction between the first absorbing wall 95 that extends substantially vertically and the second absorbing wall 96 that extends substantially horizontally. Thus, when a forward load is applied to this junction from the load transmitting wall 85, the second absorbing wall 96 applies a rearward resisting force to the load transmitting wall 85. When a downward load is applied to this junction from the load transmitting wall 85, the first absorbing wall 95 applies an upward resisting force to the load transmitting wall 85. Owing to the resisting forces applied to the load transmitting wall 85 by the first absorbing wall 95 and the second absorbing wall 96, a large amount of energy is absorbed as the load transmitting member 75 deforms over a wide range of different modes of rear end crashes. By absorbing the energy of the crash load by the deformation of the load transmitting member 75, the remaining part of the vehicle body 2 is protected from any undue loading.

In addition, as shown in FIG. 7, when the load transmitting wall 85 is slightly inclined downward toward the front, if a crash load directed to the front is applied to the rear wall 81, the junction between the first absorbing wall 95 and the second absorbing wall 96 receives from the load transmitting wall 85 a load directed in a forward and downward direction. As a result, the upper end of the first absorbing wall 95 is pushed in a forward and downward direction, and tends to tilts forward. Therefore, the load transmitting wall 85 is made more deformable under an impact load transmitted from a rear part of the vehicle body 2.

Figure 8:
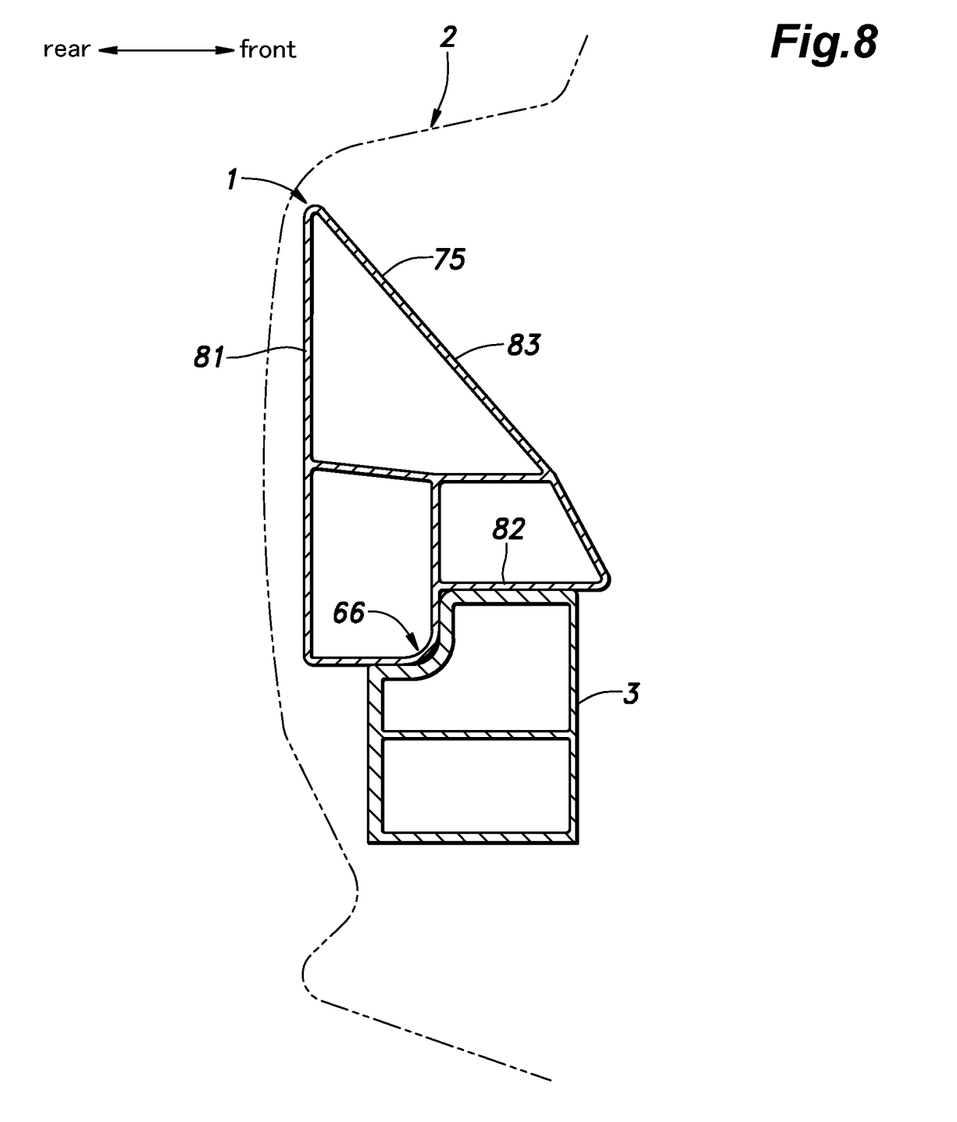
FIG. 8 is a sectional view of a rear part of a vehicle body provided with a vehicle body structure according to an alternate embodiment of the present invention.

The present invention has been described in terms of a specific embodiment, but can be modified in various ways without departing from the spirit of the present invention. For instance, the front wall recess 91 provided at the upper end of the front wall 83 is not essential for the present invention and may be omitted as illustrated in FIG. 8. Also, the present invention is applicable not only to a rear part of the vehicle body but also to a front part of the vehicle body or to a side part of the vehicle body.

The invention claimed is:

1. A vehicle body structure including a laterally extending bumper beam, wherein the bumper beam is provided with a laterally extending laterally middle part and a pair of end parts each extending from a corresponding lateral end of the middle part in an outboard direction with a certain inward slant with respect to a fore and aft direction, each end part curves at a laterally middle point thereof so as to have a concave side facing outward with respect to the fore and aft direction, the bumper beam curves so as to have a convex side facing outward and having a radius of curvature of R1 at each laterally outer end point of the middle part of the bumper beam, and the concave side of each end part of the bumper beam has a radius of curvature of R2, the radius of curvature R2 being equal to or greater than the radius of curvature R1.

2. A vehicle body structure including a laterally extending bumper beam, wherein the bumper beam is provided with a laterally extending laterally middle part and a pair of end parts each extending from a corresponding lateral end of the middle part in an outboard direction with a certain inward slant with respect to a fore and aft direction, each end part curves at a laterally middle point thereof so as to have a concave side facing outward with respect to the fore and aft direction, the bumper beam has an upper surface facing upward and an abutting surface facing outward, and is provided with a load transmitting member extending laterally on the middle part of the bumper beam, the load transmitting member being provided with a vertically extending outer wall facing outward, a lower wall extending inward from a lower edge of the outer wall and abutting against the upper surface and the abutting surface of the bumper beam, and an inner wall connected between an upper edge of the outer wall and an inner edge of the lower wall.

3. The vehicle body structure according to claim 2, wherein the lower wall includes a main portion that rests upon the upper surface of the bumper beam, and a depending portion depending downward from an outer edge of the main portion and extending along the abutting surface of the bumper beam.

4. The vehicle body structure according to claim 3, wherein the abutting surface is provided with a beam recess which is recessed inward, and the depending portion of the load transmitting member is complementarily received in the beam recess.

5. The vehicle body structure according to claim 4, wherein the beam recess is defined by a recess abutting wall depending downward from an outer edge of the upper surface of the bumper beam and defining the abutting surface on an outer side thereof with respect to the fore and aft direction, and a recess lower wall extending outward from a lower edge of the recess abutting wall.

6. The vehicle body structure according to claim 5, wherein the load transmitting member is provided with a load absorbing wall connecting the lower wall to the inner wall.

7. The vehicle body structure according to claim 6, wherein the load transmitting member is further provided with a load transmitting wall connecting the load absorbing wall to the outer wall.

8. The vehicle body structure according to claim 7, wherein the load absorbing wall includes a first absorbing wall extending upward from a boundary between the main portion and the depending portion of the lower wall, and a second absorbing wall extending inward from an upper edge of the first absorbing wall to the inner wall, and the load transmitting wall is connected to a boundary between the first absorbing wall and the second absorbing wall.

9. The vehicle body structure according to claim 2, wherein an upper end of the inner wall is provided with an inner wall recess which is recessed downward.

* * * * *